PROTECTIVE CIRCUIT FOR MAGNETIC STORAGE UNIT
Original Filed Dec. 27, 1961
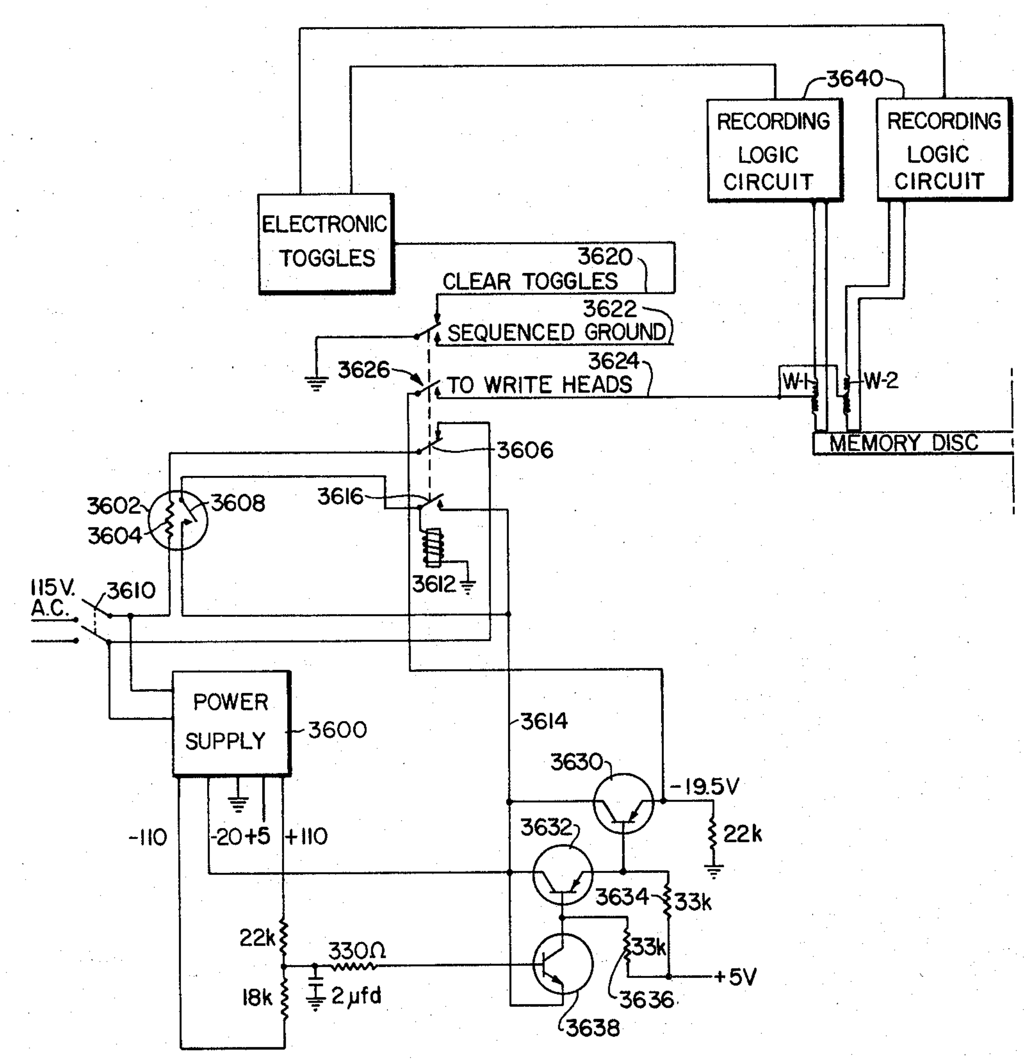
INVENTOR
WINSOR SOULE, JR.
BY Strauch, Nolan, Neale, Nies & Bronaugh
ATTORNEYS 3,389,400
PROTECTIVE CIRCUIT FOR MAGNETIC STORAGE UNIT Winsor Soule, Jr., Berkeley, Calif., assignor to SCM Corporation, New York, N.Y., a corporation of New York
Original application Dec. 27, 1961, Ser. No. 162,526, now Patent No. 3,265,874, dated Aug. 9, 1966. Divided and this application May 2, 1966, Ser. No. 546,956
6 Claims. (Cl. 346—74)

ABSTRACT OF THE DISCLOSURE

A transistorized circuit responsive to a reduction in the voltage of the power supply energizing the write heads of a magnetic recorder for preventing the alteration of recorded information due to changes in the state of the bistable, lead-selecting circuits which accompany de-energization resulting from lowering of supply voltage.

This application is a division of application Ser. No. 162,526, filed Dec. 27, 1961, now Patent No. 3,265,874, and is directed to a protective circuit for a magnetic storage unit in a data processing machine.

More specifically, this invention pertains to rapid interruption of a circuit upon shutdown of a system at day's end, upon detection of a drop of voltage in a power supply or power failure due to disconnection of a supply source, such as may result from accidental pulling of a plug, defective wiring, or the like. As subsequently described, the interruption attained by the instant protective circuit is effected at electronic speed, in contrast with mechanical switching or delayed circuit control inherent in electrical relays.

The object of this invention is a protective circuit for a magnetic memory of an electronic computer, operating through a substantially instantaneous interrupting switch in the recording head circuits.

A further object is a circuit interrupter arrangement incorporating a transistor functioning to effectively cut off operating power supplied to magnetic recording heads upon drop of voltage in the supply source.

A further and more specific object is to provide an instantaneous circuit interrupter in a line leading to center taps of magnetic recording heads, said interrupter comprising a plurality of transistors and a capacitance, said transistors switching their conductivity states in effecting interruption.

The above and other objects of the invention will become apparent from the claims and from the description as it proceeds in connection with the drawing which shows the essential electrical components and the circuits pertaining thereto.

Referring to the figure, a power supply 3600 of any suitable type is provided to supply the various voltage levels used throughout the computer. A time delay device 3602 is provided having a heating element 3604 connected across the input voltage terminals through normally closed contacts 3606. When contacts 3608 of delay device 3602 close a few seconds after the main power switch 3610 is closed, relay 3612 becomes energized through a circuit including contacts 3608 and lead 3614 which is connected to the minus 20 volt terminal of the power supply 3600. After relay 3612 is energized, it is held in the energized condition by holding contact 3616.

When the equipment is first turned on, many of the electronic toggles in the computer, being bistable flip-flop circuits, randomly assume various conducting conditions. To prevent any internal operation which might result in the loss of certain information retained in the memory unit for subsequent use, special precautions are provided to start with a clear toggles condition. The present invention is particularly important to a small desk size electronic calculator having a magnetic memory which may be provided with a normal lamp cord type connection to a wall or floor plug. Further precautions are provided to eliminate the possibility of alteration of the information in the magnetic memory and to minimize steps necessary to place the system back in operation in the event of inadvertent disconnection of the operating power.

A clear toggles level potential on lead 3620 is provided at all times relay 3612 is de-energized which is effective to cause toggle clearance. As soon as relay 3612 energizes, the sequenced ground potential on lead 3622 is provided to effect appropriate sequence signally as described in the parent application.

The write head voltage on lead 3624 from contacts 3626 of relay 3612 when energized, is applied to center taps on write heads $W_1$ and $W_2$ which write heads cooperate with a magnetic memory disc. Thus, in addition to the circuits for gating the write heads, indicated by the Recording Logic Circuits 3640, the write head voltage from lead 3624 of the power supply must also be present before information can be recorded into the memory unit, or before information already stored in the memory unit can be altered.

If for any reason, such for example as daily shutdown or inadvertent removal of the plug from the power supply during operation of the calculator, the operating voltage to the write heads $W_1$ and $W_2$ should drop below a predetermined level less than that required for satisfactory signal strength, means are provided for rapidly interrupting current flow to lead 3624 to thereby prevent any recording by the write heads.

Write head voltage on lead 3624 is supplied through a circuit including transistor 3630 which is in series with the windings of write heads $W_1$ and $W_2$. Transistors 3630 and 3632 are both PNP types with their bases connected through resistors 3634 and 3636 respectively to a plus 5 volt terminal of the power supply. The collectors of both transistors are connected to the minus 20 volt potential on lead 3614. The base of transistor 3630 is also connected to the emitter of transistor 3632 and similarly the base of transistor 3632 is also connected to the collector of another transistor 3638. Transistor 3638 is an NPN type having its emitter connected to the minus 20 volt potential on lead 3614 and its base connected to a tap on a voltage divider which is connected to plus and minus 110 volt potential terminals of the power supply. This last connection provides sufficient base current to transistor 3638 thereby causing transistor 3638 to conduct. The voltage drop across resistor 3636 in the collector circuit of transistor 3638 is thus sufficient to cause the base of transistor 3632 to be negative thereby causing that transistor to also conduct whereby the potential of its emitter, connected to the base of transistor 3630, also becomes negative. Transistor 3630 thus conducts and normally has a potential of approximately minus 19.5 volts on its emitter which potential is applied as the write head voltage on lead 3624.

When the input circuit to the power supply 3600 is broken, the magnitude of all the output voltage reduces toward zero. During power supply turn-off, the base of transistor 3638 stays relatively constant because of the 2 mfd. capacitor while the voltage on lead 3614 starts to rise toward ground. As the emitter voltage passes through approximately minus 18, conduction through transistor 3638 cuts off and its collector and the base of transistor 3632 becomes positive with respect to ground. This causes conduction through transistor 3632 to cut off, and the voltage on the emitter of transistor 3632 and the base of transistor 3630 to become positive relative to ground, to thereby cut off current conduction through transistor 3630. The cut off of transistor 3630 switches off current in circuit 3624.

The foregoing sequence takes place almost instantaneously when the negative voltage on conductor 3614 decreases from 20 volts to approximately 18 volts, and thereby precedes the drop out of relay 3612 (which is delayed by hysteresis and mechanical inertia) as well as the de-energization of the other circuits in the calculator. Since other circuits may operate indiscriminately when the power supply voltage on line 3614 becomes more positive than minus 18 volts, the earlier removal of operating voltage on line 3624 prevents write heads $W_1$ and $W_2$ from being gated on and thereby inadvertently destroying or mutilating any of the information which may be in the memory unit.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

The embodiments of the invention in which an exclusive property or privilege is claimed are defined as follows:

1. In a circuit for energizing a write head for recording on a magnetizable medium: a source of energizing voltage having a plurality of terminals; a winding on said write head having at least two terminals both of which are normally disconnected from said voltage source terminals; gating means for selectively connecting one of said winding terminals to one terminal of said source of energizing voltage; a voltage divider connected across a pair of said voltage source terminals; and circuit means including a transistor in series with said winding for connecting the other of said winding terminals to a second of said voltage source terminals, said circuit means also including means responsive to the magnitude of said energizing voltage for cutting off current conduction through said transistor when the magnitude of said energizing voltage is less than a predetermined value, said voltage responsive means comprising a second transistor having a base, collector and emitter; means connecting an input voltage between the base and emitter of said further transistor, said input voltage being derived between a point in said voltage divider which is relatively insensitive to changes of magnitude of said source voltage and said second terminal on said voltage source, said second transistor being normally biased to conduct by said input voltage and biased to cut-off when the voltage on said second voltage terminal changes toward ground potential; and electron valve means responsive to the collector potential for cutting off conduction through said first transistor when said second transistor is biased to cut-off.

2. The circuit according to claim 1 wherein said write head has three terminals, one of which constitutes a center tap; and wherein said center tap is in series with said first transistor, while the two remaining write head terminals are connected to said gating means.

3. The circuit according to claim 1 including further a relay having a pair of contacts, said pair of contacts being in the series circuit of said first transistor and said winding, and serving to open said circuit after the current therein is cut off by said first transistor.

4. A circuit according to claim 1, wherein said voltage source provides a predetermined lower voltage as the source of said energizing voltage at said second terminal and a main supply source of higher voltage, and wherein the circuit including said first transistor includes said means responsive to the magnitude of the voltage in the main supply source.

5. The circuit of claim 1 wherein said point in a voltage divider is connected to ground through a storage capacitor which has a discharge time that is slow relative to the decay of the voltage from the power supply.

6. The circuit as defined in claim 5 wherein the electron valve means responsive to the collector potential comprises a third transistor having its base connected to the collector of said second transistor, its emitter connected to the base of said first transistor and through a resistor to a potential slightly away from ground potential; and said first transistor has its emitter connected to the other of said winding terminals and through a resistance to ground and is of such type and the polarity of said potential slightly away from ground is such that cut-off of said third transistor causes cut-off of current conduction through said first transistor.

References Cited

UNITED STATES PATENTS

| | | | |
|---|---|---|---|
| 2,996,349 | 8/1961 | Mauch | 346—74 |
| 3,020,117 | 2/1962 | Hijn | 346—74 |
| 3,108,215 | 10/1963 | Bancroft | 317—31 |
| 3,129,428 | 4/1964 | Chase | 346—74 |
| 3,182,298 | 5/1965 | Lawrence | 346—74 |
| 3,271,777 | 9/1966 | Davis | 346—74 |

BERNARD KONICK, *Primary Examiner.*

L. J. SCHROEDER, *Assistant Examiner.*